(No Model.) 5 Sheets—Sheet 1.
L. WESTERLAND, Dec'd.
M. C. G. WESTERLAND, Administratrix.
ELECTRIC RAILWAY.
No. 439,262. Patented Oct. 28, 1890.
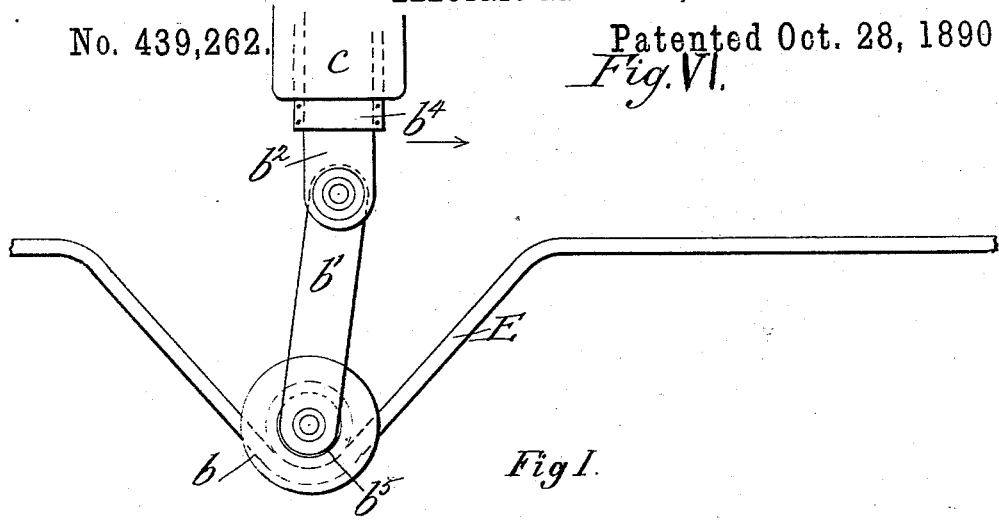
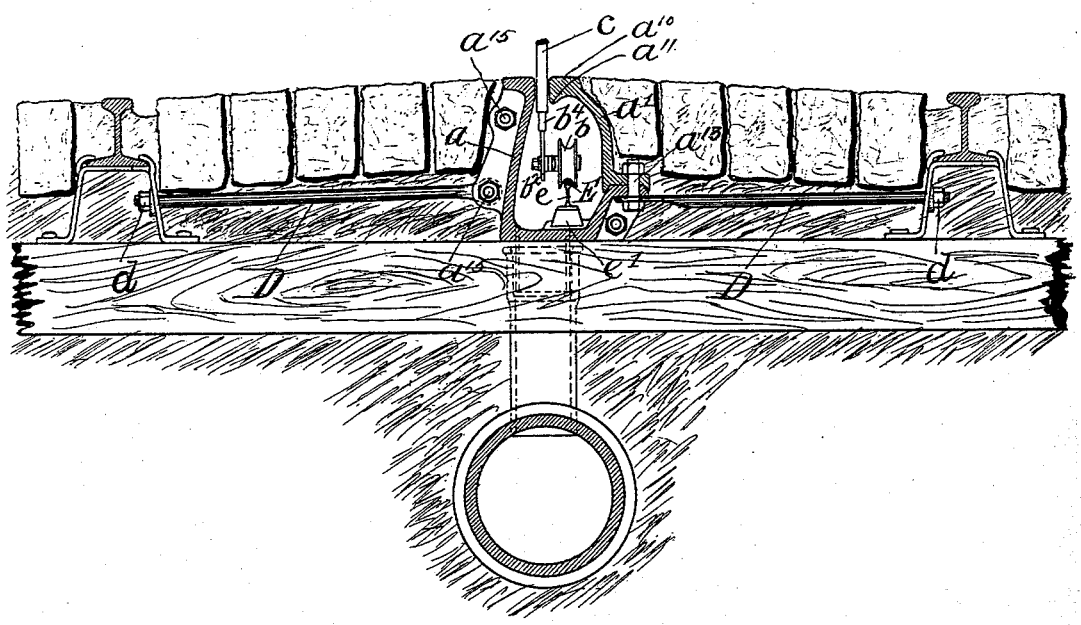
Witnesses
Inventor
Laurence Westerland
By Attorney

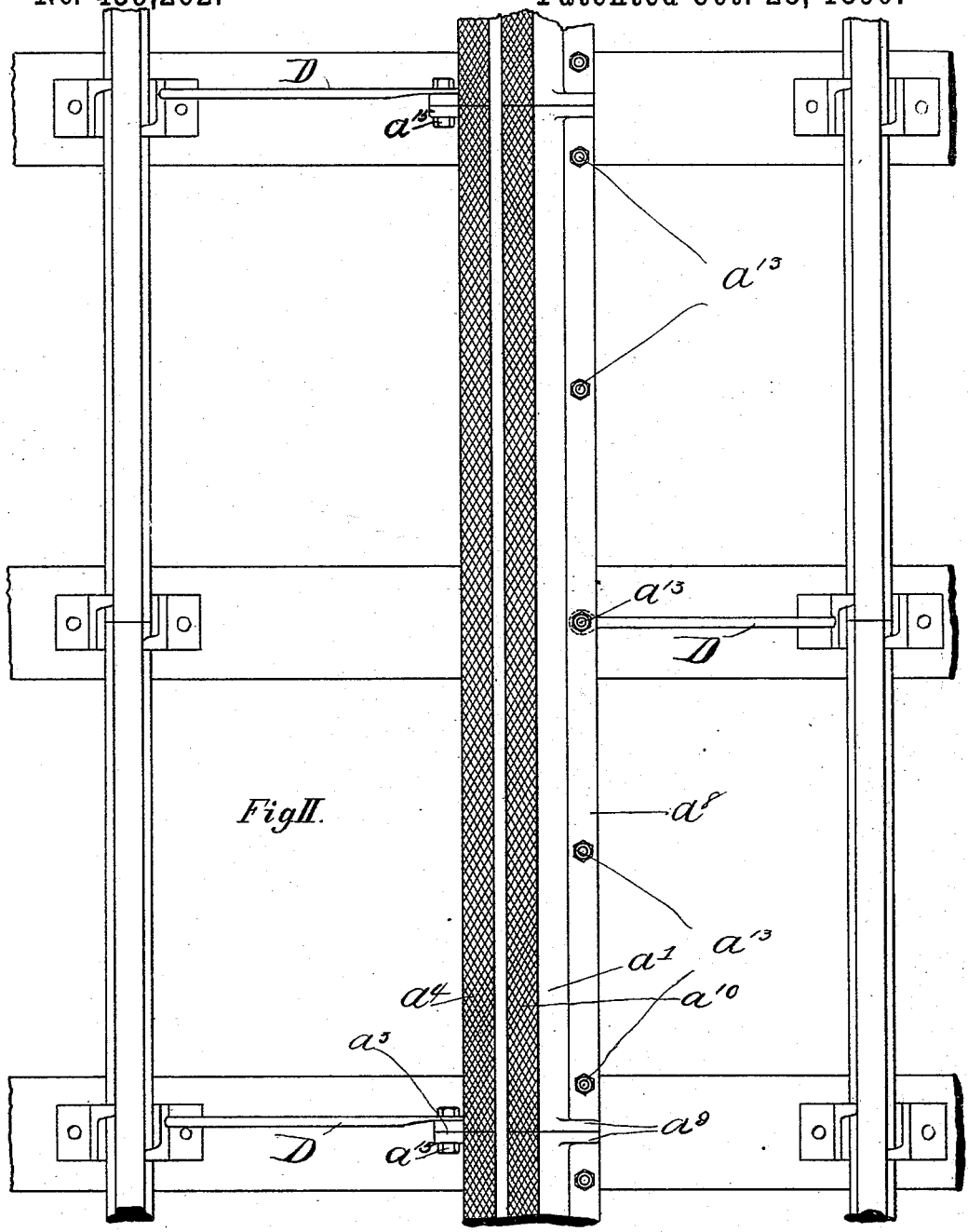

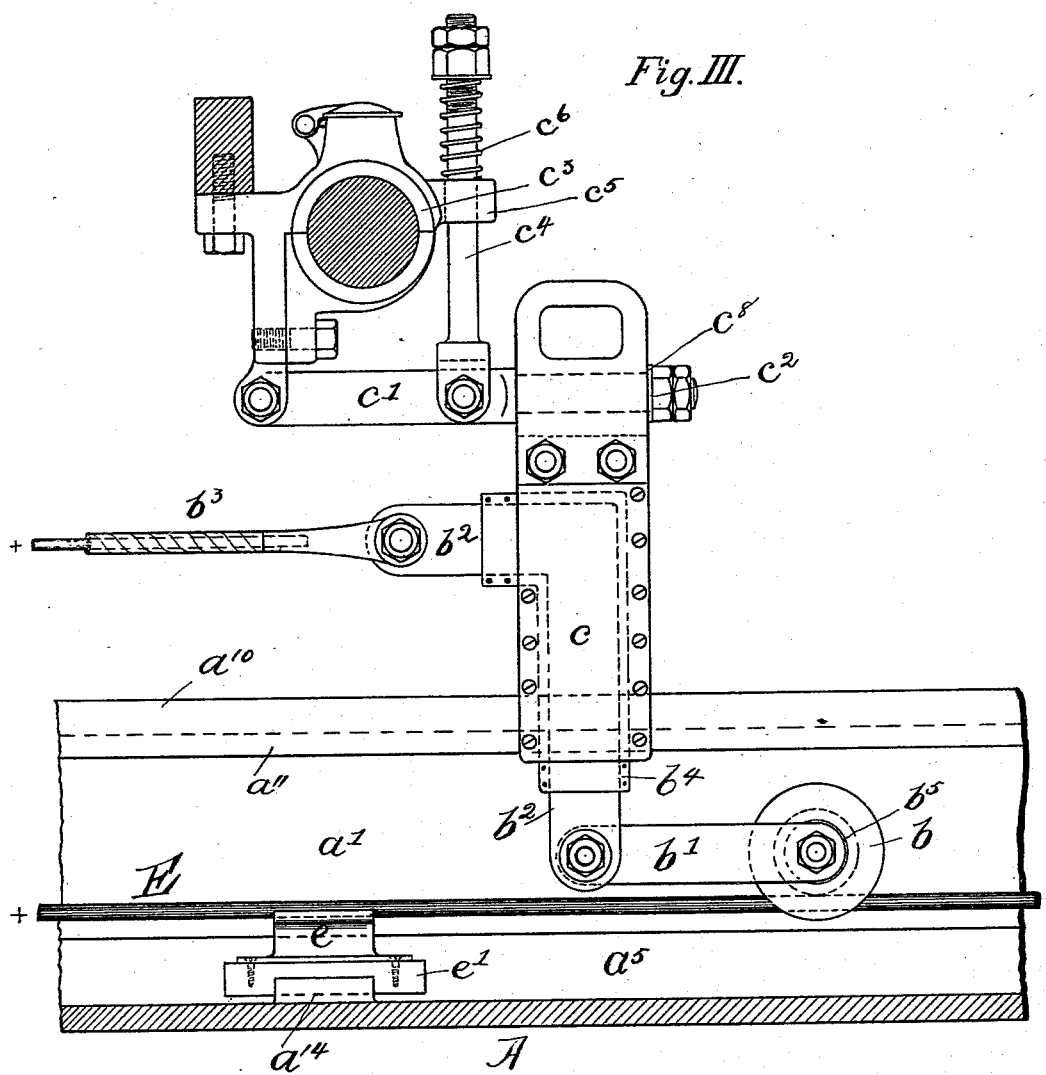

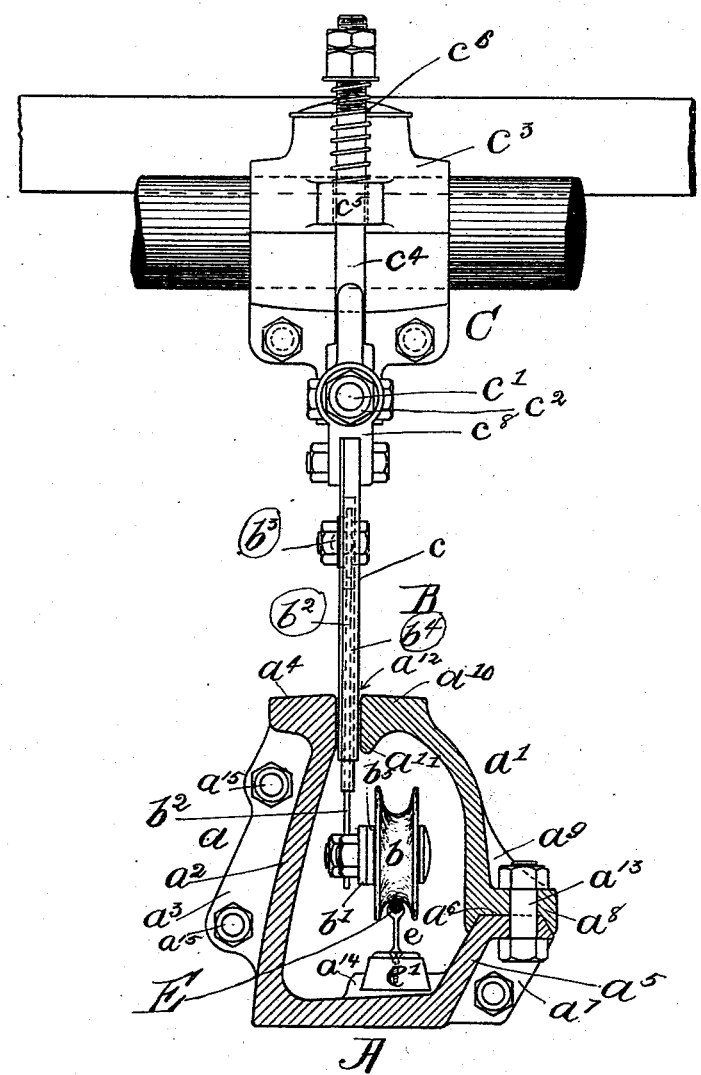

(No Model.) 5 Sheets—Sheet 5.
L. WESTERLAND, Dec'd.
M. C. G. WESTERLAND, Administratrix.
ELECTRIC RAILWAY.
No. 439,262. Patented Oct. 28, 1890.
Fig. V.
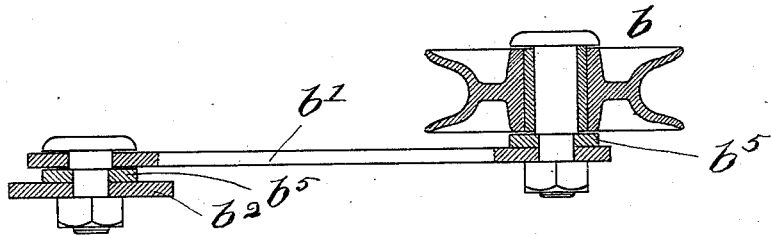
Witnesses
Inventor
Laurence Westerland
By Attorney ID="United States Patent Office"

UNITED STATES PATENT OFFICE.

LAURENCE WESTERLAND, OF ATLANTA, GEORGIA; MARY C. G. WESTERLAND ADMINISTRATRIX OF SAID LAURENCE WESTERLAND, DECEASED.

ELECTRIC RAILWAY.

SPECIFICATION forming part of Letters Patent No. 439,262, dated October 28, 1890.

Application filed May 31, 1890. Serial No. 353,866. (No model.)

*To all whom it may concern:*

Be it known that I, LAURENCE WESTERLAND, a citizen of the United States, and a resident of Atlanta, in the county of Fulton and State of Georgia, have invented certain new and useful Improvements in Electric Railways; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to electric railways, however more especially relating to improvements in means for transmitting the current at a high tension safely, and of supplying the dynamic machinery with said current, the details of all of which are hereinafter fully described and the parts claimed as new specifically pointed out.

In the accompanying drawings, Figure I is a vertical cross-section of the road-bed, showing the improved form of underground conduit, the gage-braces, and a portion of the trolley. Fig. II shows a plan of a section of road-bed, being slightly more than one conduit-joint, showing the alternating gage-braces and the checked upper surface of the conduit. Fig. III is a side elevation of the trolley and its adjustable stand, showing also the conduit in longitudinal vertical section through the slot. Fig. IV is an end elevation of the trolley and adjustable trolley-stand, also showing in vertical cross-section the conduit and conductor, and also the insulated conductor-support. Fig. V is a plan view, partly in section, showing the trolley in detail. Fig. VI shows a depression in the conductor to allow the turning of the arm carrying the trolley-wheel.

In the figures like reference-marks indicate corresponding parts in the several views.

A is the conduit; B, the trolley; C, the adjustable trolley-stand; D, the gage-braces, and E the conductor.

The conduit A is composed of two parts $a$ and $a'$. The major half has a side $a^2$ extending downward at a slight angle to the perpendicular to widen the base of the conduit, the flanges $a^3$ forming a brace strengthening said side and also a bearing-surface of large area for the ends of each section. The flange $a^4$, extending laterally at the top, strengthens the upper surface against the strains due to superincumbent weights. The conduit is substantially straight across the bottom, and has the short vertical side $a^5$, which carries on its top edge a flat bearing-surface $a^6$, having its edges beveled and being braced by the end flanges $a^7$, which also serve as end bearing-surfaces for the conduit-sections.

The part $a'$ of the conduit has a concave bearing $a^8$ on its bottom edge corresponding in form to the beveled bearing-surface $a^6$, by reason of which construction the registering of the substantially tapering surfaces will make a "driven" fit and make a practically water-tight joint. The said side $a'$ extends upwardly from the said part $a^8$, being as best shown in Fig. IV, its form being curvilinear in cross-section, being braced by the flange $a^9$, and carrying on its top the part $a^{10}$, forming a street-surface on its top, checked like its corresponding part on the part $a$, while resistance to strains from superincumbent weight is provided for in the flange $a^{11}$, which projects downwardly and forms one side of the slot $a^{12}$, the vertical portion of the part $a^4$ of the part $a$ forming the other side of said slot. As so far described, the two parts $a$ and $a'$ of the conduit may be cast each in any ordinary two-part flask, and do not require coring to produce the interior chamber, which will be of obviously great advantage in the molding and for a saving of time in the molding, and for the reason that there will be no faulty castings to be broken and remelted; also, as is best seen in Fig. I, the part $a'$ may be readily removed and access quickly had to the interior of the conduit, as is frequently necessary, to do which a very small portion only of the paving would have to be removed, and for the reason that said part $a'$, by reason of its exterior form, affords a good foundation for the paving-blocks, the return of the pavement to its original position exactly would be but a simple matter, and would not require the work of experts. The bolts $a^{13}$ securely hold the parts $a$ and $a'$ together.

On the interior side of the bottom of the conduit is placed the dovetailed seat $a^{14}$, which holds the non-conducting conductor-support $e$. The conductor is run, as shown, some distance one side from directly under the slot, which will prevent substances from dropping onto the conductor through said slot, and obviating all trouble from sparking and pitting the trolley-wheel; also, it will be impossible for any one to ground the current through his person without going systematically to work with a small bent conductor to touch the conductor E, owing to the said relative position of the slot and the said conductor. The conductor-support $e$ is in the shape of a short section of T-rail, concaved on its top to receive the conductor, which is brazed or soldered. Between the metallic seat $a^{14}$ and the support $e$ is a non-conducting block $e'$ of earthenware, fiber, or other non-conductor of proper electrical resistance. This block $e'$ is formed to correspond with the dovetailed seat $a^{14}$, and the part $e$ is secured thereto in any approved way. After being laid, gage-braces D, consisting of metallic rods, are used, one end of each of which is flattened and perforated and the other screw-threaded to receive a nut. The flattened ends are secured to the conduit by means of the bolts $a^{13}$ and $a^{15}$, while the other or screw-threaded ends are passed through the rail-chair, preserving the gage, and also insuring the constant central position of the conduit.

The trolley B consists of the usual collector (shown in the wheel $b$) carried on an arm $b'$, pivoted to the conductor $b^2$. Especially efficacy is claimed for this form of trolley-construction, inasmuch as the wheel may be drawn after the conductor at all times, a depression of the wire E being formed at each end thereof, which will allow the arm carrying the wheel to swing down nearly vertical, and as the car starts back said wheel will drop down into it, and as it ascends the incline will fall back. The conductor $b^2$ is preferably of L shape, as shown in Fig. III, and is held in a metallic casing $c$, a sheathing of non-conducting material $b^4$ being interposed between said metallic conductor $b^2$ and its casing $c$. The casing $c$ is made in two parts and is bolted together, holding the insulated conductor $b^2$ securely between the parts. The conductor $b^2$ is perforated at its bottom and the arm $b$ secured thereto, so as to have motion in a vertical plane around said pivotal point, the washers $b^5$ providing for offset of the wheel from the slot to the conductor E, while the upper end of said conductor is provided with suitable means for the attachment of the cable $b^3$, running to the switch and rheostat. The casing $c$ is supported by the head $c^8$, which has motion sidewise on the end of the lever $c'$, said end being journaled for that purpose, nuts $c^2$ insuring said head $c^8$ against motion longitudinally of said journal. The said lever $c'$ is pivoted to an arm depending from the box $c^3$, in which the car-axle runs, said box being secured by bolts to an adjacent position of the truck. Said lever has vertical adjustment by means of a screw $c^4$, passing upwardly from its pivotal connection to said lever through a lug $c^5$ on the box $c^3$, a spring $c^6$ furnishing elasticity to the movement on the screws $c^4$, regulating the height of the conductor $b^2$ relative to the conductor E.

Having thus described my invention, what I claim as new, and desire to secure by Letters Patent, is—

1. In a device of the class specified, a conduit formed of two parts seated together on corresponding taper bearings $a^6$ and $a^8$, substantially as and for the purpose specified, and having a slot between them at their tops.

2. In a device of the class specified, the conduit A, formed in two parts, the part $a$ having a long side $a^2$ and a short side $a^5$, and a part $a'$, completing the side of the conduit and so formed as to allow free access to the interior without disturbing the conduit in its setting, substantially as shown and described, and for the purpose specified.

3. In a device of the class described, a conduit composed of the L-shaped part $a$ and the curved part $a'$ and the flanges $a^3$, $a^8$, and $a^9$, for the purposes specified, and substantially as shown and described.

4. In a device of the class specified, the trolley-wheel $b$, carried on a lever $b'$, said lever, pivoted to the L-shaped conductor $b^2$, being in circuit with the motor and having suitable insulation, substantially as specified.

5. In a device of the class specified, the trolley consisting of the wheel $b$, carried on lever $b'$, and lever $b'$, pivotally connected to a conducting supporting-arm $b^2$, the whole being suspended from the axle, substantially as specified.

6. In a device of the class specified, the trolley-stand consisting of the lever $c'$, pivoted to the box $c^3$, carried by the axle, and the screw $c^4$, pivotally secured to said lever and having play vertically, governed and made resilient by means of a spring $c^6$ thereon, and means for the attachment to the free end of said lever of the wheel $b$, for the purpose specified.

7. In a device of the class specified, the combination of head $c^8$, carried in a suitable manner on the car and having secured thereto the plates $c$, having between them and insulated therein the L-shaped conductor $b^2$, carrying a current-collector, and the cable $b^3$, connecting the motor and said conductor $b^2$ electrically, substantially as and for the purpose specified.

In testimony whereof I hereunto affix my signature in presence of two witnesses.

LAURENCE WESTERLAND.

Witnesses:
A. P. WOOD,
S. C. WOOD.